United States Patent
Kaltschmidt (10) Patent No.: US 7,327,895 B2
(45) Date of Patent: Feb. 5, 2008

(54) METHOD AND APPARATUS FOR FILTERING A DIGITAL IMAGE ACQUIRED WITH A MEDICAL DEVICE USING A SPATIAL-FREQUENCY OPERATOR

(75) Inventor: Rainer Kaltschmidt, Neunkirchen am Brand (DE)

(73) Assignee: Siemens Aktiengesellschaft, Munich (DE)

( * ) Notice: Subject to any disclaimer, the term of this patent is extended or adjusted under 35 U.S.C. 154(b) by 801 days.

(21) Appl. No.: 10/401,615

(22) Filed: Mar. 28, 2003

(65) Prior Publication Data

US 2003/0228065 A1    Dec. 11, 2003

(30) Foreign Application Priority Data

Mar. 28, 2002 (DE) .............................. 102 14 114

(51) Int. Cl.
*G06K 9/40* (2006.01)
(52) U.S. Cl. .................................... 382/260
(58) Field of Classification Search ............... 382/265
See application file for complete search history.

(56) References Cited

U.S. PATENT DOCUMENTS

| | | | | |
|---|---|---|---|---|
| 6,295,382 B1 * | 9/2001 | Karanovic | ................... | 382/261 |
| 6,332,044 B1 * | 12/2001 | Loce et al. | ................... | 382/269 |
| 7,031,545 B2 * | 4/2006 | Wang | ......................... | 382/255 |

OTHER PUBLICATIONS

"Digitale Bildsignalverarbeitung: Grundlagen, Verfahren, Beispiele," Wahl (1984) pp. 71-111.

\* cited by examiner

*Primary Examiner*—Matthew C. Bella
*Assistant Examiner*—Alex Liew
(74) *Attorney, Agent, or Firm*—Schiff Hardin LLP

(57) ABSTRACT

In a method and an apparatus for filtering a digital image acquired with a medical device by means of a spatial-frequency operator that automatically allow an optimum filtering of the source image, the integral signal-to-noise ratio of the digital image is calculated, a limit value for the integral signal-to-noise ratio of the filtered image is calculated from the integral signal-to-noise ratio of the digital image, the digital image is iteratively filtered with the spatial-frequency operator $\overline{R}$ with variation of the dosage g and with calculation of the integral signal-to-noise ratio in the filtered image, afterward iteration of the integral signal-to-noise ratio of the filtered image is compared to the limit value for the integral signal-to-noise ratio, the iterative filtering of the digital image with the spatial-frequency operator $\overline{R}$ is aborted when the integral signal-to-noise ratio of the filtered image reaches the limit value for the integral signal-to-noise ratio or when a range of control (if present) for the dosage g has been exhausted, and the dosage g most recently employed in the iterative filtering is employed as the optimum dosage $g_{opt}$ for a filtering of the entire digital image under consideration with the spatial-frequency operator $\overline{R}$ employed.

52 Claims, 4 Drawing Sheets

FIG 3
PRIOR ART

METHOD AND APPARATUS FOR FILTERING A DIGITAL IMAGE ACQUIRED WITH A MEDICAL DEVICE USING A SPATIAL-FREQUENCY OPERATOR

BACKGROUND OF THE INVENTION

1. Field of the Invention

The present invention is directed to a method as well as to an apparatus for filtering a digital image acquired with a medical device by means of a spatial-frequency operator.

2. Description of the Prior Art

With the increasing spread of digital X-ray apparatuses and computed tomography systems, images of an examination subject (for example, a patient) acquired with a medical device are increasingly in digital form and are thus accessible to digital image processing.

The medical devices usually provide the digital images in the form of an image matrix. A digital image is thus composed of a raster, with the number of rows and columns of the raster corresponding to the number of rows and columns of the picture elements (pixels) of the digital image. In, for example, a grayscale image (such as, for example, a digital X-ray image), exactly one grayscale value is allocated to each raster value, and thus to each picture element. Modern medical devices typically can distinguish up to 4,096 grayscale values per picture element.

Color images are represented by a number of such image matrices wherein the respective distribution of the irradiation intensity of a primary color is stored. Fundamentally, thus, the same processing techniques of digital image processing that are applicable for grayscale images can be applied to color images.

Filters play a key part in digital image processing. A filter is generally understood as an operator that generates a filtered image when it is applied to a source image.

Filters particularly serve for extracting desired information from an image. Since certain properties of an image thus are emphasized by means of filtering, but filtering is always accompanied by an information loss since other properties of the image are placed in the background.

Simple operators that, for example, implement the calculation of in image negative of the source image successively consider only the values of the individual picture elements of the source image and calculate the corresponding values of the individual picture elements of the filtered image therefrom.

More complex filters (for example filters that sharpen or soften (smooth, blur), in contrast, place the values of the individual picture elements of the source image into relationship with the values of the picture elements surrounding them and calculate respective picture elements of the filtered image therefrom. Such more complex filters are generally represented in the form of a filter matrix. The central component of the filter matrix is the function that is applied to the particular picture element of the source image that corresponds to the picture element of the filtered image to be calculated. The functions surrounding the central component of the matrix are applied to the picture elements that surround the respective picture element of the source image. The picture element to be calculated for the filtered image is then derived from the sum of the functions of the filter matrix applied to the respective picture elements.

Figure 3:
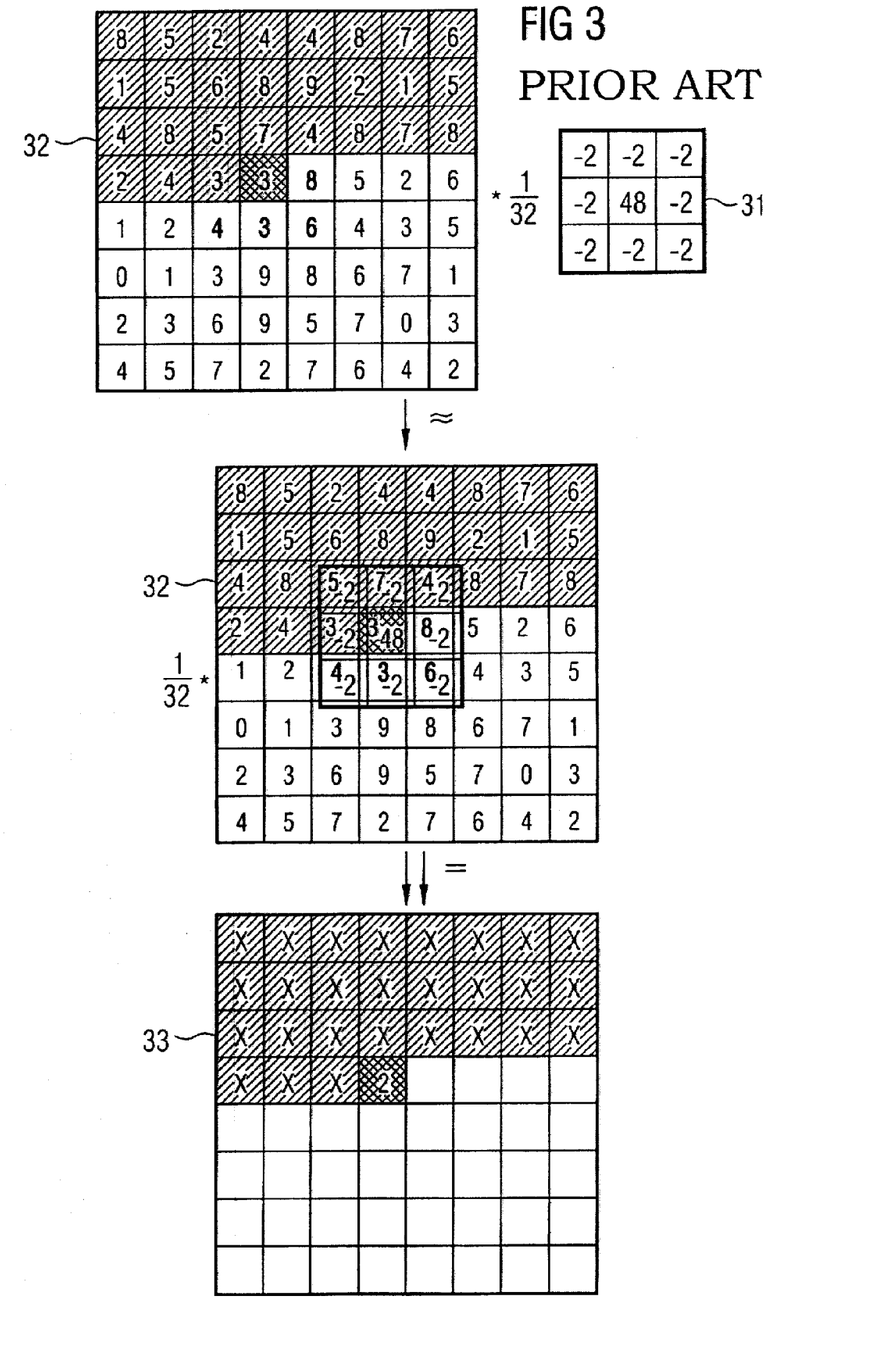
FIG. 3 is a schematic illustration of the fundamental procedure for filtering a digital image.

FIG. 3 schematically shows the application of such a filter matrix 31 to a digital source image 32.

As can be seen from FIG. 3, the value of the sought picture element (indicated by double hatching) of the filtered image 33 is derived by operating on the corresponding picture element in the source image 32 with a filter matrix 31. The filter matrix 31 thus also determines which surrounding picture elements are also included in the operation. In the example of FIG. 3, this results in a value $$\tfrac{1}{32}[5(-2)+7(-2)+4(-2)+3(-2)+3\cdot 48+8(-2)+3(-2)+6(2)]=2$$

As indicated, this calculation is implemented for each picture element of the source image 32 in order to obtain all picture elements of the filtered image 33. For simplicity, the values of the other picture elements of the filtered image 33 that have already been calculated are not explicitly calculated in FIG. 3 but are referenced "X".

As also can be seen from this example, edge regions of the source image 32 are problematical in the filtering since the filter matrix 31 extends beyond the edge region of the source image when applied to respective picture elements in the edge region. There are various possibilities for solving this problem such as attaching picture elements from the opposite side of the image or an extrapolation beyond the edge of the image. Naturally, however, these methods are also affected by errors.

The filters that are most frequently employed for filtering a digital image acquired with a medical device can be divided into two categories:

Those referred to as "sharpening" filters are the most widespread in the medical field and produce an edge boosting in the filtered image.

Those referred to as "softening" filters produce a noise suppression in the filtered image.

The filter effects of the sharpening and of the softening filters are opposite, so that the application of a sharpening filter also unavoidably results in the quantum noise, that is always present in the source image being likewise intensified. Correspondingly, the edge sharpness of the source image decreases given the application of a softening filter.

It is clear from the above that no filter can be described that is optimum for all applications since different filter properties (for example, edge enhancement or noise suppression) are always of primary interest dependent on the quality and type of the digital (source) image and the applied purpose.

For solving this problem, it is known to make a group of suitable filters available with respectively different, subjective softening or sharpening effects. A certain pre-selection of employable filters from this group is made through the operating mode of the medical device and an evaluating physician can select therefrom.

A disadvantage of this approach is that the physician must often evaluate a number of unsuitable images until an optimum filter can be found. It is also disadvantageous that this procedure consumes a great deal of time, since the repeated filtering of the source image with various filters takes a certain time due to the calculating outlay connected therewith.

It is also known to prescribe a standard filter function with which all source images are filtered and to vary the filter effect by adjustment of the degree of the source image that participates in the filtering. The adjustment can ensue, for example, by selectively weighting the source image to be operated on.

A disadvantage of this approach, however, is that the standard filter function can be defined only inadequately defined since it is not equally well-suited for all operating modes of the medical device and for all test subjects that come into consideration. Another disadvantage is that a certain minimum number of unsuitable images again must be evaluated until an optimum filter effect can be found.

SUMMARY OF THE INVENTION

An object of the present invention is to provide a method and an apparatus for filtering a digital image acquired with a medical device with an spatial-frequency operator that automatically allow an optimum filtering of the source image.

This object is achieved in a method and apparatus for filtering a digital image acquired with a medical device with an spatial-frequency operator, whereby the dosage of the filtering is variable, wherein the integral signal-to-noise ratio of the digital image is calculated, a limit value for the integral signal-to-noise ratio of the filtered image is calculated from the integral signal-to-noise ration of the digital source image, the digital image is iteratively filtered with the spatial-frequency operator with iterative variation of the dosage and with iterative integral signal-to-noise ratio of the filtered image is calculated after each iteration, each iteratively calculated integral signal-to-noise ratio of the filtered image is compound as it arises to the limit value for the integral signal-to-noise ratio, the iterative filtering of the digital image with the spatial-frequency operator is aborted when the integral signal-to-noise ratio of the filtered image reaches the limit value for the integral signal-to-noise ratio or when an existing range of control (if present) for the dosage has been exhausted, and the dosage most recently employed in the iterative filtering at the time of the abort is used as the optimum dosage for filtering the entire digital image under consideration with the spatial-frequency operator employed.

As used herein, a spatial-frequency operator $\overline{R}$ means the respective matrix characterizing the spatial-frequency filter employed for filtering the digital image. Consequently, the terms spatial-frequency operator and spatial-frequency filter can be synonymously employed herein.

As used herein, the "dosage" of the filtering means a manipulated variable for the degree (the intensity) of the filter effect of the spatial-frequency filter employed.

On the basis of the integral signal-to-noise ratio, thus, it is inventively possible to specify a limit value for the integral signal-to-noise ratio of the filtered image. An optimum dosage for the digital source image and the spatial-frequency operator employed for the filtering is automatically derived by means of this limit value for the integral signal-to-noise ratio of the filtered image. An attending physician thus can be presented with an optimally filtered image without having to evaluate a number of unsuitable images.

In a first preferred embodiment, it is especially advantageous, given employment of a sharpening spatial-frequency operator, to calculate the integral signal-to-noise ratio of the digital image by defining a test image window whose area is smaller than that of the unfiltered image, sampling the unfiltered image with the test image window and calculating of the respective integral signal-to-noise ratio in the test image window during the sampling, comparing the calculated integral signal-to-noise ratios to one another, determining the test image window of the unfiltered image with the maximum integral signal-to-noise ratio, and employing the identified, maximum integral signal-to-noise ratio as the integral signal-to-noise ratio of the digital image.

By defining a test image window whose area is smaller than that of the unfiltered (source) image, it is possible in a simple way to design the dosage of the filtering for a region of the digital image with maximum integral signal-to-noise ratio. The definition of a test image window is also advantageous because the integral signal-to-noise ratio of the overall filtered image plays less of a part in the quality of the filtered image than does the integral signal-to-noise ratio in homogeneous regions of the filtered image. Such homogeneous regions can be selected by the definition of a test image window and the integral signal-to-noise ratio in this regions can be elevated to the criterion for the subsequent filtering.

In the first preferred embodiment, it is also especially advantageous to iteratively filter the digital image with calculation of the integral signal-to-noise ratio in the filtered image and to compare the filtered image to the limit value for the integral signal-to-noise ratio ensue only within the identified test image window of the unfiltered image with the maximum integral signal-to-noise ratio.

As a result, the time expenditure required for the implementation of the inventive method can be considerably reduced since only an iterative filtering of the test image window with the spatial-frequency operator is required with variation of the dosage. This is to be because the calculating time required for a filter operation is highly dependent on the size of the region to be filtered. The implementation of the filtering in the clinically acceptable time of approximately one second therefore generally cannot be achieved in the case of a filtering of the overall digital source image.

In this first embodiment, it is also advantageous to vary the dosage in the iterative filtering of the unfiltered digital image with the spatial-frequency operator so that the integral signal-to-noise ratio in the filtered image increases, beginning with the integral signal-to-noise ratio of the digital image, up to the limit value for the integral signal-to-noise ratio.

Given employment of a softening spatial-frequency operator, it is especially advantageous in a second preferred embodiment to calculate the minimum integral signal-to-noise ratio of the digital image by defining a test image window whose area is smaller than that of the unfiltered image, sampling the unfiltered image with the test image window, and calculating the integral signal-to-noise ratio in the test image window during the sampling, comparing the calculated, integral signal-to-noise ratios to one another, determining the test image window of the unfiltered image with minimum integral signal-to-noise ratio, and employing the identified, minimum integral signal-to-noise ratio as the integral signal-to-noise ratio of the digital image.

It is also especially advantageous according to the second preferred embodiment to iteratively filter the digital image with calculation of the integral signal-to-noise ratio in the filtered image and to compare the respective filtered image to the limit value for the integral signal-to-noise ratio only within the identified test image window of the unfiltered image with the maximum integral signal-to-noise ratio.

It is also advantageous in the described, second embodiment to vary the dosage in the iterative filtering of the unfiltered digital image with a suitable spatial-frequency operator so that the integral signal-to-noise ratio in the filtered image decreases, beginning with the integral signal-to-noise ratio of the digital image, to the limit value for the integral signal-to-noise ratio.

Particularly given employment of a test image window, it is also especially advantageous to filter the entire unfiltered image with the spatial-frequency operator using the optimum dosage.

In order to optimally preclude statistical errors and be able to acquire a homogeneous region in the digital image well, and to keep the required calculating time for the implementation of the inventive method short as well, it is advantageous for the area of the test image window to correspond to between $$\frac{1}{64} \text{ and } \frac{1}{512}$$

of the area of the unfiltered digital image.

It has proven especially advantageous when the area of the test image window corresponds to $$\frac{1}{256}$$

of the area of the unfiltered digital image.

It is advantageous to calculate the limit value for the integral signal-to-noise ratio in the filtered image by addition of a variable minimum value for the integral signal-to-noise ratio to a product of the calculated integral signal-to-noise ratio of the digital image and a noise characteristic.

It is also advantageous in the calculation of the limit value for the integral signal-to-noise ratio of the filtered image from the integral signal-to-noise ratio of the digital image to employ a value of the noise characteristic that is dependent on the spatial-frequency operator.

As a result, an adaptation to sharpening or softening spatial-frequency operators is possible in a simple way.

The value of the noise characteristic for a sharpening spatial-frequency operator thereby preferably amounts to between +0.02 and +0.12 and that for a softening spatial-frequency operator amounts to between −1.50 and −0.50.

Especially advantageous results can be achieved, however, when the value of the noise characteristic amounts to +0.07 for a sharpening spatial-frequency operator and to −1.00 for a softening spatial-frequency operator.

For better adaptation of the calculated limit value for the integral signal-to-noise ratio of the filtered image to the spatial-frequency operator employed, it is also advantageous for the magnitude of the minimum value for the integral signal-to-noise ratio to be dependent on the spatial-frequency operator employed. As a result thereof, an even better adaptation to sharpening or softening spatial-frequency operators can be achieved.

The integral signal-to-noise ratio for each iteration can be especially simply calculated by calculating the standard deviation of the pixel intensities of the picture elements under consideration, calculating the arithmetic average of the pixel intensities of the pixel elements under consideration, and dividing the arithmetic average determined in this way by the standard deviation.

It is advantageous for limit values of the definition range of the picture element intensity not to be taken into consideration in the calculation of the integral signal-to-noise ratio since these are not influenced by the following filtering.

Especially good results can be achieved when the spatial-frequency operator employed is selected from a group of spatial-frequency operators dependent on a test subject on which the digital image is based. In this way, first, an adaptation to disturbances characteristic of the test subject is possible, and a selection from various sharpening and softening spatial-frequency operators can be made.

It is also advantageous when the iterative operation on the unfiltered image with the spatial-frequency operator $\overline{R}$ ensues by convolution of the unfiltered image with a convolution filter $\overline{C}$, whereby the convolution filter $\overline{C}$ is calculated from the spatial-frequency operator $\overline{R}$, the dosage g and the identity $\overline{I}$ in the following way:

$$\overline{C}_g = \left(\frac{g+1}{g}\right) \cdot \overline{I} - \frac{1}{g}\overline{R}_g$$

with $\forall g \neq 0$.

A consistency with the spatial-frequency operator is achieved for the dosage g=100 via the transformation $\overline{R}_g = \overline{I} + g \cdot (\overline{I} - \overline{C}_g)$, i.e. $\overline{R}_{100} = \overline{R}$. A range of control of $0 < g \leq 100$ is thus established for the dosage g given employment of the above equation. This is especially user-friendly since the dosage thus is presented as a percent regulator. Moreover, problems are avoided that would necessarily occur if the range of control for the dosage were unlimited.

In order to enable a fine adjustment of the inventively, automatically optimally filtered image for a user, it is also advantageous when, proceeding from the optimum dosage, a manual variation of the dosage can be performed by a user by means of a slide control.

DESCRIPTION OF THE PREFERRED EMBODIMENTS

Figure 1:
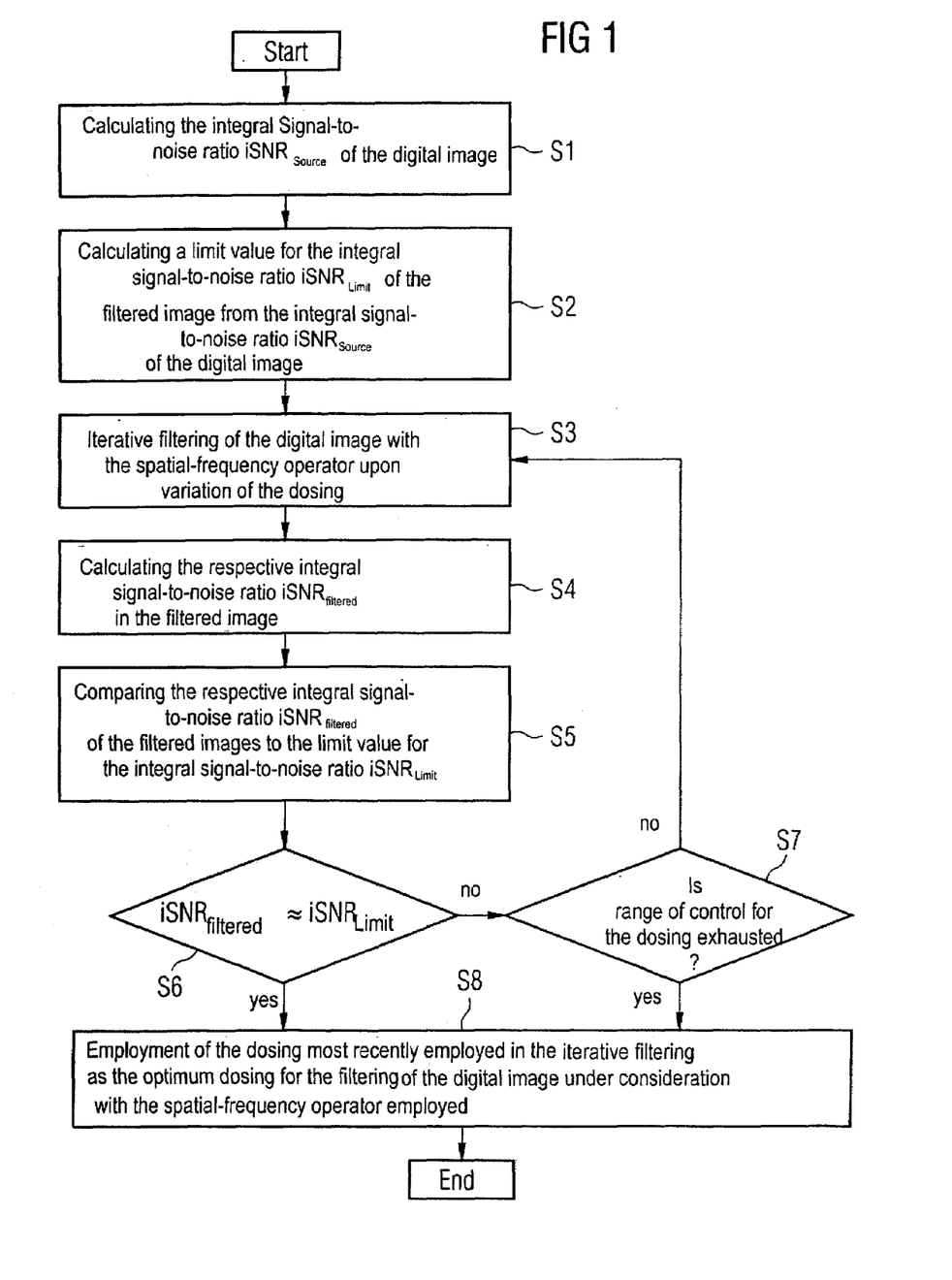
FIG. 1 is a flowchart of the inventive method.

The inventive method for filtering a digital image acquired with a medical device by means of a spatial-frequency operator $\overline{R}$ is described in detail on the basis of FIG. 1, whereby the dosage g of the filtering is variable.

According to the present invention, the integral signal-to-noise ratio (also referred to as flat-field signal-to-noise ratio) $iSNR_{Source}$ of the digital (source) image is first calculated in step S1.

Subsequently, a limit value for the integral signal-to-noise ratio $iSNR_{Limit}$ of the filtered image is calculated in step 2 from the integral signal-to-noise ratio $iSNR_{Source}$ of the digital (source) image.

Figure 2:
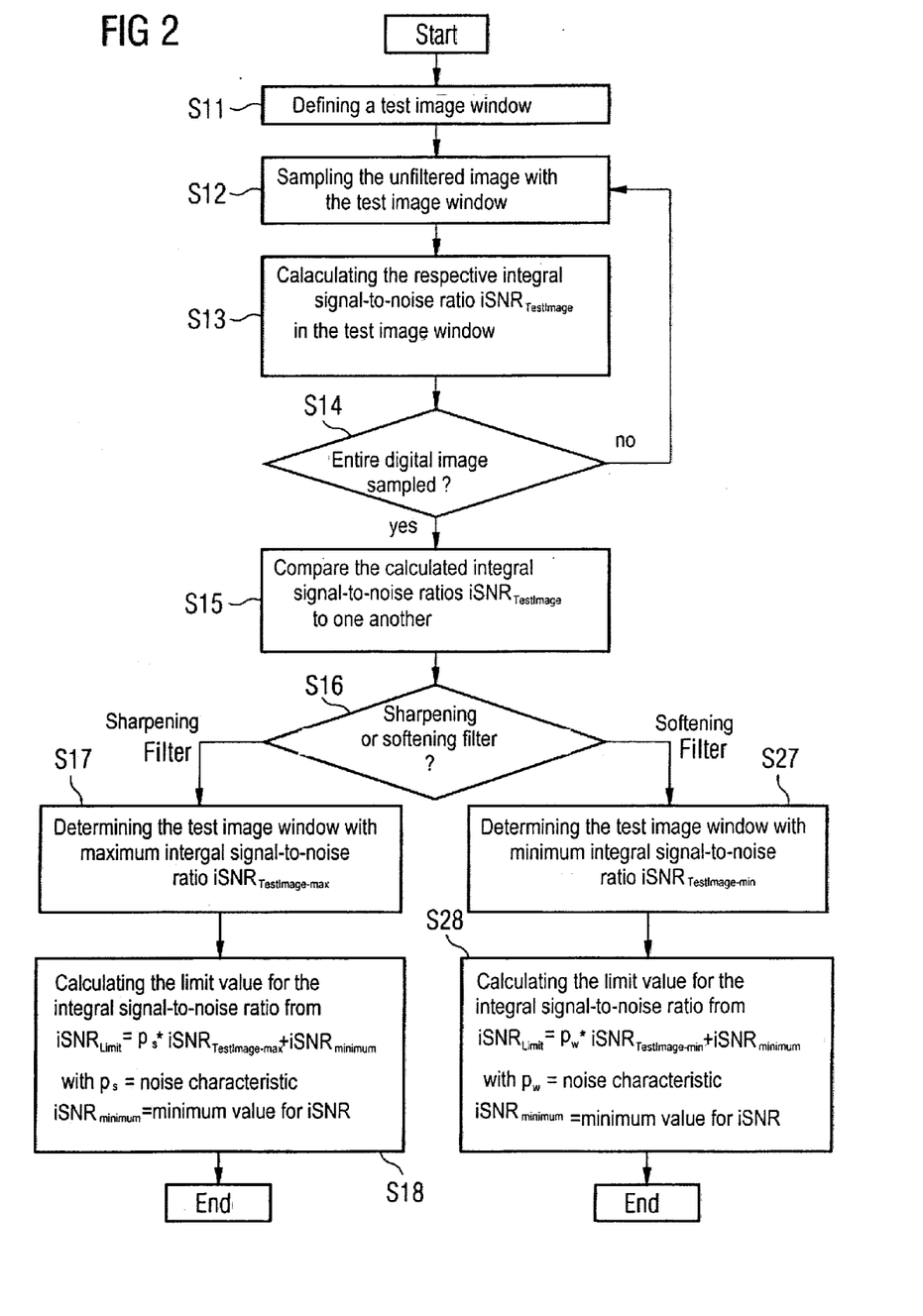
FIG. 2 is a flowchart of a part of the inventive method according to a preferred embodiment.

Since the calculation of the integral signal-to-noise ratio $iSNR_{Source}$ of the digital image and the calculation of the limit value for the signal-to-noise ratio $iSNR_{Limit}$ of the filtered image are essential for the execution of the inventive method, these method steps are explained in greater detail in FIG. 2 on the basis of a preferred embodiment.

According to the preferred embodiment of the present invention shown in FIG. 2, a test image window whose area is smaller than the area of the digital image to be filtered is first defined in step S11.

The area of the test image window thereby preferably corresponds to between 1/64 and 1/512 of the area of the digital image to be filtered and corresponds to 1/256 of the area of the digital image in an especially preferred embodiment.

Subsequently, the entire area of the digital image is sampled with the test image window in step S12.

During the sampling, the integral signal-to-noise ratio $iSNR_{Testimage}$ of each picture element in the test image window is calculated in step S13.

The calculation of the respective integral signal-to-noise ratio $iSNR_{testimage}$ is implemented in the following way according to this preferred embodiment:

First, the standard deviation of the picture element intensities of the picture elements (pixels) of the test image window is calculated, and the arithmetic average of the picture element intensities of the picture elements of the test image window is determined. Subsequently, the sought integral signal-to-noise ratio $iSNR_{Testimage}$ is acquired by dividing the arithmetic average of the picture element intensities identified in this way by the standard deviation of the picture element intensities.

It is especially advantageous when limit values of the range of definition of the picture element intensities are not taken into consideration in the calculation of the integral signal-to-noise ratio since these limit values are also not influenced by the filtering described below.

The sampling of the digital image with the test image window in step S12 and the calculation of the respective integral signal-to-noise ratio $iSNR_{Testimage}$ in the test image window according to step S13 are implemented until a decision is made in step S14 that the entire area of the digital image has been sampled with the test image window.

Subsequently, the calculated, integral signal-to-noise ratios $iSNR_{Testimage}$ of the respective test image windows are compared to one another in step S15.

A decision must be made in the following step S16 as to whether the spatial-frequency operator $\overline{R}$ to be employed for the filtering of the digital image is a sharpening or a softening filter function.

When the decision is made in step S16 that the spatial-frequency operator R to be employed is a sharpening filter, then the test image window with maximum integral signal-to-noise ratio $iSNR_{Testimage-max}$ is first determined in the step S17.

In step S18, the limit value for the integral signal-to-noise ratio $iSNR_{Limit}$ of the filtered image is subsequently calculated from the maximum integral signal-to-noise ratio $iSNR_{Testimage-max}$.

The limit value for the integral signal-to-noise ratio $iSNR_{Limit}$ preferably is derived by addition of a variable minimum value for the integral signal-to-noise ratio $iSNR_{minimum}$ to a product of the calculated, maximum integral signal-to-noise ratio $iSNR_{Testimage-max}$ and a noise characteristic $P_s$:

$$iSNR_{Limit} = p_s * iSNR_{Testimage-max} + iSNR_{minimum}.$$

When, in contrast, a decision is made in step S16 that the spatial-frequency operator $\overline{R}$ to be employed is a softening filter, then the test image window with minimum signal-to-noise ratio $iSNR_{Testimage-min}$ is first determined in step S27.

In step S28, the limit value for the integral signal-to-noise ratio $iSNR_{Limit}$ of the filtered image is subsequently calculated from the minimum integral signal-to-noise ratio $iSNR_{Testimage-min}$ according to the equation $$iSNR_{Limit} = p_W * iSNR_{Testimage-min} + iSNR_{minimum}.$$

$p_W$ thereby stands for the value of a noise characteristic for softening filters and $iSNR_{minimum}$ stands for a minimum value for the integral signal-to-noise ratio.

In general, the value of the noise characteristic $P_s$, $p_W$ is dependent on the spatial-frequency operator $\overline{R}$ employed, so that the noise characteristic $p_s$ for sharpening filters and the noise characteristic $p_W$ for softening filters are different.

For a sharpening spatial-frequency operator $\overline{R}$, the value of the noise characteristic $p_s$ preferably amounts to between +0.02 and +0.12 and to +0.07 according to the described, especially preferred embodiment. The value of the noise characteristic $p_W$ for a softening spatial-frequency operator $\overline{R}$ preferably amounts to between −1.50 and −0.50 and to −1.00 according to the described, especially preferred embodiment.

The magnitude of the minimum value for the integral signal-to-noise ratio $iSNR_{minimum}$ also can be varied dependent on the spatial-frequency operator $\overline{R}$ employed.

In the preferred embodiment shown FIG. 2, the height of the minimum value for the integral signal-to-noise ratio $iSNR_{minimum}$, however, is equal to the value 4, i.e. $iSNR_{minimum}=4$, both for sharpening as well as for softening spatial-frequency operators $\overline{R}$.

After the calculation of the integral s-s $iSNR_{Source}$ of the digital image and of the limit value for the integral signal-to-noise ratio $iSNR_{Limit}$ of the filtered image in steps S1 and S2 of the flowchart shown in FIG. 1, the digital image is iteratively filtered with the spatial-frequency operator $\overline{R}$ with variation of the dosage g in the following step S3.

After each iterative filtering in step S3, the respective integral signal-to-noise ratio $iSNR_{filtered}$ in the filtered image is calculated in step S4.

The integral signal-to-noise ratio $iSNR_{filtered}$ of the filtered image calculated in this way (as a running value) is compared to the limit value for the integral signal-to-noise ratio $iSNR_{Limit}$ of the filtered image in the following step S5.

When the limit value for the integral signal-to-noise ratio $iSNR_{Limit}$ of the filtered image was calculated according to the preferred embodiment shown in FIG. 2, then it is advantageous to implement the iterative filtering of the digital image with calculation of the respective integral signal-to-noise ratio $iSNR_{filtered}$ in the filtered image (steps S4 and S4) only in the maximum or minimum integral signal-to-noise ratio $iSNR_{Testimage-max}$, $iSNR_{Testimage-min}$ determined in step S17 or S27 respectively of FIG. 2.

Since, in addition to being dependent on the depth of the employed filter, the calculating time of the iterative filtering in step S3 is also highly dependent on the size of the digital image to be filtered, the calculating time required for the iterative filtering can be considerably reduced—without disadvantage for the functioning of the inventive method—when the iterative filtering is implemented only in the test image window, whose area is smaller than that of the digital image.

When a decision is made in the following step S6 that the integral signal-to-noise ratio $iSNR_{filtered}$ of the filtered image reaches the limit value for the integral signal-to-noise ratio $iSNR_{Limit}$ of the filtered image (whereby complete identity is not required), then the value for the dosage g most recently employed in the iterative filtering in step S3 is employed in the following step S8 as the optimum value for the dosage $g_{opt}$ for a filtering of the entire digital image under consideration with the spatial-frequency operator $\overline{R}$ to be employed.

When the steps S3 through S5 given the above-described employment of a test image window have been implemented only within the test image window, then a filtering of the overall unfiltered image ensues in a following step (not shown in FIG. 1) with the spatial-frequency operator $\overline{R}$ using the optimum dosage $g_{opt}$ in order to automatically offer an optimally filtered image.

When, in contrast, a decision is made in step S6 that the integral signal-to-noise ratio iSNR$_{filtered}$ of the filtered image does not yet reach the limit value for the integral signal-to-noise ratio iSNR$_{Limit}$ of the filtered image, then another check is made in the following step S7 to determine whether a range of control (i.e. it exists) for the dosage g has been exhausted.

If this is not the case, then the iterative filtering of the digital image is continued in step S3 upon variation of the dosage g.

When, in contrast, a decision is made in step S7 that an existing range of control for the dosage g has been exhausted, then the method continues with step S8, wherein the value for the dosage g most recently employed in the iterative filtering in step S3 is employed as the optimum value for the dosage g$_{opt}$ for a filtering of the digital image under consideration with the spatial-frequency operator $\overline{R}$ to be employed.

The step S3 of the method shown in FIG. 1 shall be discussed again in greater detail below, relating to the iterative filtering of the digital image or of the test image window with the spatial-frequency operator $\overline{R}$ with variation of the dosage g.

It should be noted first that the spatial-frequency operator $\overline{R}$ employed is preferably selected from a group of spatial-frequency operators $\overline{R}$ dependent on a test subject underlying the digital (source) image, since an optimally good matching to a measuring method or to a test subject being observed thus can be achieved.

In a preferred embodiment, the iterative filtering of the digital image with the spatial-frequency operator $\overline{R}$ with variation of the dosage g ensues by convolution of the unfiltered image with a convolution filter $\overline{C}$, whereby the convolution filter $\overline{C}$ is calculated as follows from the spatial-frequency operator $\overline{R}$, the dosage g and the identity $\overline{I}$:

$$\overline{C} = \left(\frac{g+1}{g}\right) \cdot \overline{I} - \frac{1}{g} \cdot \overline{R}_g.$$

A particular advantage of this equation for calculating the convolution filter $\overline{C}$ is that an identity of $\overline{R}$ derives for g=100, i.e. $\overline{R}_{100}=\overline{R}$. Preferably, g can thus be varied in the sense of a percentage regulator in a range of 0<g≦100, but the value g=0 is precluded for mathematical reasons (impermissible division by zero).

During the iterative filtering in step S3 of the embodiment shown in FIG. 1, it is especially advantageous given employment of a sharpening spatial-frequency operator $\overline{R}$ to vary the dosage g such that, beginning with the integral signal-to-noise ratio iSNR$_{Source}$ of the digital image, the integral signal-to-noise ratio iSNR$_{filtered}$ in the filtered image increases toward the limit value for the integral signal-to-noise ratio iSNR$_{Limit}$ of the filtered image.

Given employment of a softening spatial-frequency operator $\overline{R}$ it is correspondingly advantageous to vary the dosage g such that, beginning with the integral signal-to-noise ratio iSNR$_{Source}$ of the digital image, the integral signal-to-noise ratio iSNR$_{filtered}$ in the filtered image decreases toward the limit value for the integral signal-to-noise ratio iSNR$_{Limit}$ of the filtered image.

The inventive method is implemented in an apparatus (shown in FIG. 4 having a filter device 34) fashioned for the implementation of the above-described method.

Figure 4:
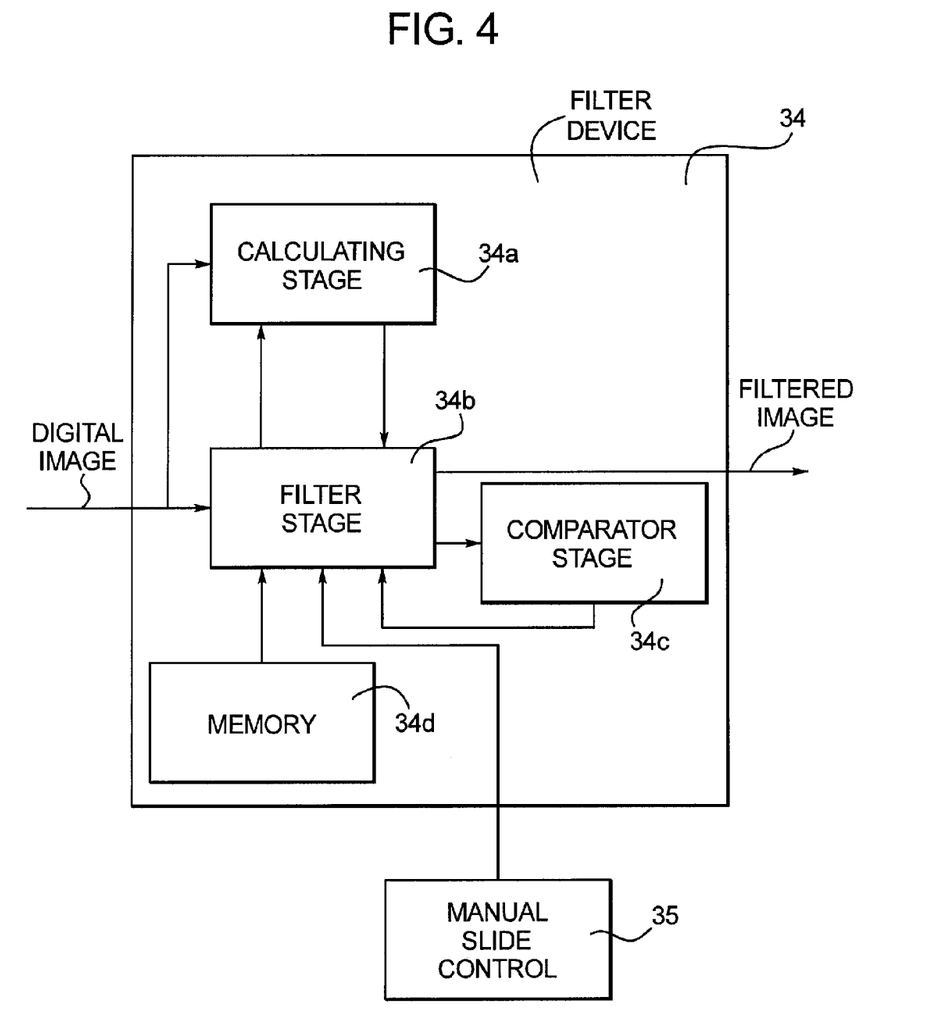
FIG. 4 us a schematic block diagram of an apparatus for performing the inventive method.

The filter device 34 includes a calculating stage 34a that is configured to perform the aforementioned calculations based on an incoming digital image that is supplied thereto. The incoming digital image is also supplied to a filter stage 34b that communicates with the calculating stage 34a to employ the calculated results for the iterative filtering of the digital image. The comparison of ISNR$_{Filtered}$ to iSNR$_{Limit}$ that is performed in a comparator stage 34c, which supplies an abort signal back to the filter stage 34b when the aforementioned comparison criterion is satisfied. The filter stage 34b then supplies the filtered image at an output of the filtered device 34.

The aforementioned group of spatial-frequency operators, that are dependent on a test subject on which the digital image is based, can be stored in a memory 34d that is accessible by the filter stage 34b for selection of one of the stored spatial-frequency operators for use in the iterative filtering.

This filter device 34, for example, can be a component of a medical system for acquiring digital images or can be a computer.

According to an embodiment of the present invention slide control 35 can be provided that, proceeding from the automatically calculated optimum dosage g$_{opt}$, enables a manual variation of the dosage g in the filter device 34 by a user.

By automatic determination of an optimum value for the dosage g$_{opt}$ from the integral signal-to-noise ratio iSNR$_{Source}$ of a digital image dependent on the spatial-frequency operator $\overline{R}$, it is thus possible according to the present invention to provide a method and an apparatus for filtering a digital image acquired with a medical device by means of a spatial-frequency operator $\overline{R}$ that automatically allow an optimum filtering of the source image.

Although modifications and changes may be suggested by those skilled in the art, it is the intention of the inventor to embody within the patent warranted hereon all changes and modifications as reasonably and properly come within the scope of his contribution to the art.

I claim as my invention:

1. A method for filtering a digital image, acquired with a medical device, comprising the steps of:
    calculating an integral signal-to-noise ratio of a digital image;
    calculating a limit value for said integral signal-to-noise ratio of a filtered image from said integral signal-to-noise ratio of said digital image;
    iteratively filtering said digital image with a spatial-frequency operator while varying a dosage of the filtering, thereby producing a plurality of iteratively filtered images;
    as each of said iteratively filtered images is produced, calculating the integral signal-to-noise ratio of that iteratively filtered image;
    comparing the integral signal-to-noise ratio of each of the iteratively filtered images to said limit value;
    aborting said iterative filtering of said digital image with the spatial-frequency operator when the integral signal-to-noise ratio of one of said iteratively filtered images reaches said limit value; and
    employing the dosage most recently employed when said iterative filtering was aborted as an optimum dosage for filtering said digital image with said spatial-frequency operator to produce said filtered image.

2. A method as claimed in claim 1 wherein the variation of said dosage has a range of control associated therewith, and wherein the step of aborting said iterative filtering comprises aborting said iterative filtering of said digital image with said spatial-frequency operator when either the integral signal-to-noise ratio of one of said filtered images reaches said limit value or when said range of control for said dosage is exhausted.

3. A method as claimed in claim 1 comprising employing a sharpening spatial-frequency operator as said spatial-frequency operator, and wherein the step of calculating the integral signal-to-noise ratio of said digital image comprises:
defining a test image window having an area which is smaller than an area of said digital image;
sampling said digital image with said test image window in a plurality of samplings;
for each sampling, calculating the integral signal-to-noise ratio in the test image window;
comparing the integral signal-to-noise ratios in the respective test image windows to each other;
determining a test image window having a maximum integral signal-to-noise ratio; and
employing said maximum integral signal-to-noise ratio as the integral signal-to-noise ratio of said digital image.

4. A method as claimed in claim 3 comprising iteratively filtering said digital image, and calculating the integral signal-to-noise ratio in the iteratively filtered images only within said test image window having said maximum integral signal-to-noise ratio.

5. A method as claimed in claim 1 comprising employing a sharpening spatial-frequency operator as said spatial-frequency operator, and varying said dosage in the iterative filtering of said digital image with said spatial frequency operator to increase the respective integral signal-to-noise ratios in the iteratively filtered images, beginning with said integral signal-to-noise ratio of said digital image to said limit value.

6. A method as claimed in claim 2 comprising filtering an entirety of said digital image with said spatial-frequency operator using said optimum dosage.

7. A method as claimed in claim 3 comprising employing a test image window having an area between $1/64$ and $1/512$ of the area of said digital image.

8. A method as claimed in claim 7 comprising employing a test image having an area of $1/256$ of the area of said digital image.

9. A method as claimed in claim 1 comprising employing a softening spatial-frequency operator as said spatial-frequency operator, and wherein the step of calculating the integral signal-to-noise ratio of said digital image comprises:
defining a test image window having an area which is smaller than an area of said digital image;
sampling said digital image with said test image window in a plurality of samplings;
for each sampling, calculating the integral signal-to-noise ratio in the test image window;
comparing the integral signal-to-noise ratios in the respective test image windows to each other;
determining a test image window having a minimum integral signal-to-noise ratio; and
employing said minimum integral signal-to-noise ratio as the integral signal-to-noise ratio of said digital image.

10. A method as claimed in claim 9 comprising iteratively filtering said digital image, and calculating the integral signal-to-noise ratio in the iteratively filtered images only within said test image window having said minimum integral signal-to-noise ratio.

11. A method as claimed in claim 1 comprising employing a softening spatial-frequency operator as said spatial-frequency operator, and varying said dosage in the iterative filtering of said digital image with said spatial frequency operator to decrease the respective integral signal-to-noise ratios in the iteratively filtered images, beginning with said integral signal-to-noise ratio of said digital image to said limit value.

12. A method as claimed in claim 9 comprising filtering an entirety of said digital image with said spatial-frequency oscillator using said optimum dosage.

13. A method as claimed in claim 9 comprising employing a test image window having an area between $1/64$ and $1/512$ of the area of said digital image.

14. A method as claimed in claim 13 comprising employing a test image having an area of $1/256$ of the area of said digital image.

15. A method as claimed in claim 1 comprising calculating said limit value by adding a variable minimum value for said integral signal-to-noise ratio to a product of said integral signal-to-noise ratio calculated for said digital image and a noise characteristic.

16. A method as claimed in claim 15 comprising employing a noise characteristic dependent on said spatial-frequency operator.

17. A method as claimed in claim 16 comprising employing a sharpening spatial-frequency filter as said spatial-frequency filter, and employing a noise characteristic in a range between 0.02 and 0.12.

18. A method as claimed in claim 17 comprising employing a noise characteristic of 0.07.

19. A method as claimed in claim 16 comprising employing a softening spatial-frequency operator as said spatial-frequency operator, and employing a noise characteristic in a range between −1.50 and −0.50.

20. A method as claimed in claim 19 comprising employing a noise characteristic of −1.00.

21. A method as claimed in claim 15 comprising employing a minimum value for said integral signal-to-noise ratio having a magnitude dependent on said spatial-frequency operator.

22. A method as claimed in claim 1 wherein the step of calculating each integral signal-to-noise ratio comprises the steps of:
calculating a standard deviation of pixel intensities of picture elements entering into the calculation of the integral signal-to-noise ratio;
calculating an arithmetic average of said pixel intensities; and
dividing said arithmetic average by said standard deviation.

23. A method as claimed in claim 1 comprising identifying limit values of a definition range of pixel intensities of picture elements In said digital image and precluding consideration of said limit values in calculating said integral signal-to-noise ratio.

24. A method as claimed in claim 1 wherein mid digital image Is a digital image of a subject, and comprising the additional steps of providing a group of different spatial-frequency operators and selecting a spatial-frequency operator from said group of spatial-frequency operators, as said spatial-frequency operator in said iterative filtering.

25. A method as claimed in claim 1 comprising calculating a convolution filter $\overline{C}$ from said spatial-frequency operator according to $$\overline{C} = \left(\frac{g+1}{g}\right) \cdot \overline{I} - \frac{1}{g} \cdot \overline{R}_g.$$

wherein $\overline{R}_g$ is the spatial-frequency operator, g is the dosage and $\overline{I}$ is the identity, and wherein the step of iteratively filtering said digital Image with said spatial frequency operator comprises convolving said digital image with said convolution filter.

26. A method as claimed in claim 1 comprising manually varying said dosage, proceeding from said optimum dosage.

27. An apparatus for filtering a digital image, acquired with a medical device, comprising:
a filter device having an input supplied with a digital image, and an output, said filter device including a calculation stage configured to calculate an integral signal-to-noise ratio of said digital image, and a limit value for said integral signal-to-noise ratio of a filtered image from said integral signal-to-noise ratio of said digital image, a filter stage configured to iteratively filter said digital image with a spatial-frequency operator while varying a dosage of the filtering, thereby producing a plurality of iteratively filtered images, and said calculating stage being configured, as each of said iteratively filtered images is produced, to calculate the integral signal-to-noise ratio of that iteratively filtered image, the and a comparator stage, as each of said iteratively filtered images is produced, supplied with said integral signal-to-noise ration of that iteratively filtered image from said calculating stage, said comparator being configured to compare said integral signal-to-noise ratio of that iteratively filtered image to said limit value, and to supply a signal to said filter stage causing said filter stage to abort, said iterative filtering of said digital image with the spatial-frequency operator when the integral signal-to-noise ratio of one of said iteratively filtered images reaches said limit value, and said filter stage being configured to employ the dosage most recently employed when said iterative filtering was aborted as an optimum dosage to filter said digital image with said spatial-frequency operator to produce said a filtered image of said digital image at said output.

28. An apparatus as claimed in claim 27 wherein the variation of said dosage has a range of control associated therewith, and wherein said comparator is configured to emit said signal causing said iterative filtering to be aborted when either the integral signal-to-noise ratio of one of said filtered images reaches said limit value or when said range of control for said dosage is exhausted.

29. An apparatus as claimed in claim 27 wherein said filter stage is configured to employ a sharpening spatial-frequency operator as said spatial-frequency operator, and wherein said calculating stage is configured to calculate the integral signal-to-noise ratio of said digital image by defining a test image window having an area which is smaller than an area of said digital image, and to sample said digital image with said test image window in a plurality of samplings and, for each sampling, to calculate the integral signal-to-noise ratio in the test image window, and to compare the integral signal-to-noise ratios in the respective test image windows to each other, and to determine a test image window having a maximum integral signal-to-noise ratio, and to employ said maximum integral signal-to-noise ratio as the integral signal-to-noise ratio of said digital image.

30. An apparatus as claimed in claim 29 wherein said filter stage is configured to iteratively filter said digital image, and wherein the calculating stage is configured to calculate the integral signal-to-noise ratio in the iteratively filtered images, only within said test image window having said maximum integral signal-to-noise ratio.

31. An apparatus as claimed in claim 27 wherein said filter stage is configured to a sharpening spatial-frequency operator as said spatial-frequency operator, and to vary said dosage in the iterative filtering of said digital image with said spatial frequency operator to increase the respective integral signal-to-noise ratios in the iteratively filtered images, beginning with said integral signal-to-noise ratio of said digital image to said limit value.

32. An apparatus as claimed in claim 28 wherein said filter stage is configured to filter an entirety of said digital image with said spatial-frequency operator using said optimum dosage.

33. An apparatus as claimed in claim 29 wherein said a calculating stage is configured to define said test image window as having an area between $1/64$ and $1/512$ of the area of said digital image.

34. An apparatus as claimed in claim 33 wherein said a calculating stage is configured to define said test image as having an area of $1/256$ of the area of said digital image.

35. An apparatus as claimed in claim 27 wherein said filter stage is configured to employ a softening spatial-frequency operator as said spatial-frequency operator, and wherein said calculating stage is configured to calculate the integral signal-to-noise ratio of said digital image by defining a test image window having an area which is smaller than an area of said digital image, and to sample said digital image with said test image window in a plurality of samplings and, for each sampling, to calculate the integral signal-to-noise ratio in the test image window, comparing the integral signal-to-noise ratios in the respective test image windows to each other, and to determine a test image window having a minimum integral signal-to-noise ratio, and to employ said minimum integral signal-to-noise ratio as the integral signal-to-noise ratio of said digital image.

36. An apparatus as claimed in claim 35 wherein said filter stage is configured to iteratively filter said digital image, and wherein said calculating stage is configured to calculate the integral signal-to-noise ratio in the iteratively filtered images only within said test image window having said minimum integral signal-to-noise ratio.

37. An apparatus as claimed in claim 27 wherein said filter stage is configured to employ a softening spatial-frequency operator as said spatial-frequency operator, and to vary said dosage in the iterative filtering of said digital image with said spatial frequency operator to decrease the respective integral signal-to-noise ratios in the iteratively filtered images, beginning with said integral signal-to-noise ratio of said digital image, to said limit value.

38. An apparatus as claimed in claim 35 wherein said filter stage is configured to filter an entirety of said digital image with said spatial-frequency oscillator using said optimum dosage.

39. An apparatus as claimed in claim 35 wherein said a calculating stage is configured to define said test image window as having an area between $1/64$ and $1/512$ of the area of said digital image.

40. An apparatus as claimed in claim 39 wherein said a calculating stage is configured to define said test image as having an area of $1/256$ of the area of said digital image.

41. An apparatus as claimed in claim 27 wherein said calculating stage is configured to calculate said limit value by adding a variable minimum value for said integral signal-to-noise ratio to a product of said integral signal-to-noise ratio calculated for said digital image and a noise characteristic.

42. An apparatus as claimed in claim 41 wherein said filter stage is configured to employ a noise characteristic dependent on said spatial-frequency operator.

43. An apparatus as claimed in claim 42 wherein said filter device is configured to employ a sharpening spatial-frequency filter as said spatial-frequency filter, and to employ a value for said noise characteristic in a range between 0.02 and 0.12.

44. An apparatus as claimed in claim 43 wherein said filter stage is configured to employ a value for said noise characteristic of 0.07.

45. A method as claimed in claim 42 wherein said filter stage is configured to employ a softening spatial-frequency operator as said spatial-frequency operator, and to employ a value for said noise characteristic in a range between −1.50 and −0.50.

46. An apparatus as claimed in claim 27 wherein said filter stage is configured to employ a value for said noise characteristic of −1.00.

47. An apparatus as claimed in claim 27 wherein said calculating stage is configured to employ a minimum value for said integral signal-to-noise ratio having a magnitude dependent on said spatial-frequency operator.

48. An apparatus as claimed in claim 27 wherein said calculating unit is configured to calculate each integral signal-to-noise ratio by calculating a standard deviation of pixel intensities of picture elements entering into the calculation of the integral signal-to-noise ratio, and to calculate an arithmetic average of said pixel intensities, and to divide said arithmetic average by said standard deviation.

49. An apparatus as claimed in claim 27 wherein said calculating stage is configured to identify limit values of a definition range of pixel intensities of picture elements in said digital image and to preclude consideration of said limit values in calculating said integral signal-to-noise ratio.

50. An apparatus as claimed in claim 27 wherein said digital image is a digital image of a subject, and wherein said filter device comprises a memory, accessible by said filter stage, containing a group of different spatial-frequency operators and wherein said filter stage is configured to select a spatial-frequency operator from said group of spatial-frequency operators, for use as said spatial-frequency operator in said iterative filtering.

51. An apparatus as claimed in claim 27 wherein said filter stage is configured to calculate a convolution filter $\overline{C}$ from said spatial-frequency operator according to $$\overline{C} = \left(\frac{g+1}{g}\right) \cdot \overline{I} - \frac{1}{g} \cdot \overline{R}_g.$$

wherein $\overline{R}_g$ is the spatial-frequency operator, g is the dosage and $\overline{I}$ is the identity, and to iteratively filter said digital image with said spatial frequency operator by convolving said digital image with said convolution filter.

52. An apparatus as claimed in claim 27 comprising a slide control connected to said filter device to allow manual varying of said dosage, proceeding from said optimum dosage.

* * * * *